Jan. 11, 1966    W. A. AYRES    3,228,394
GILL-TYPE UNDERWATER BREATHING EQUIPMENT
AND METHODS FOR REOXYGENATING
EXHALED BREATH
Filed Nov. 30, 1962    6 Sheets-Sheet 2
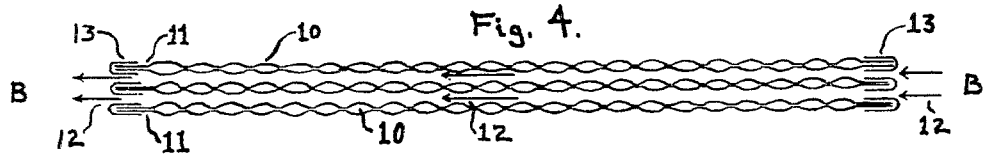
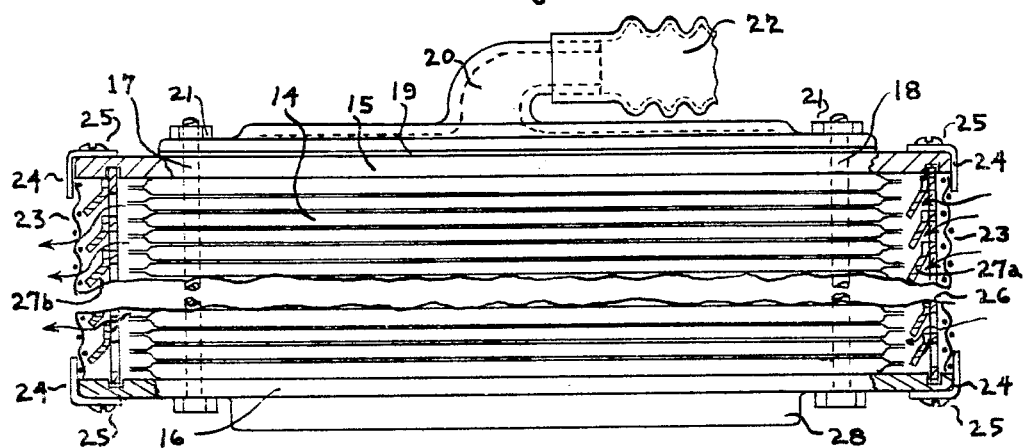
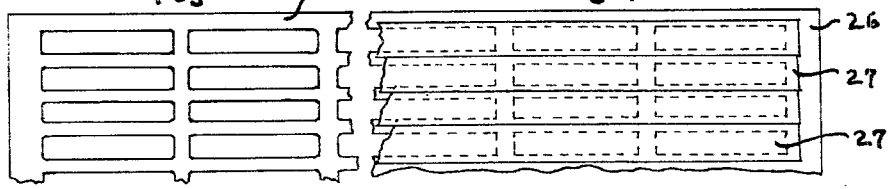
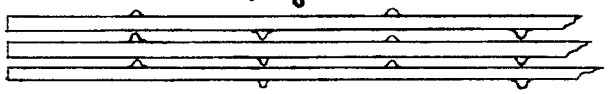
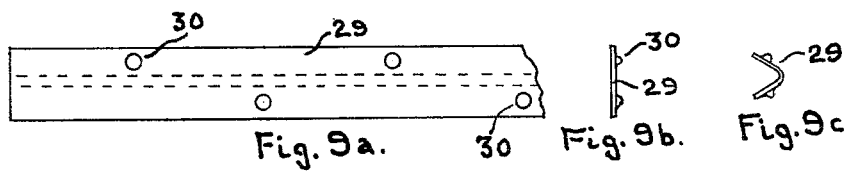
INVENTOR
Waldemar A. Ayres.
BY Pech & Pech
ATTORNEY

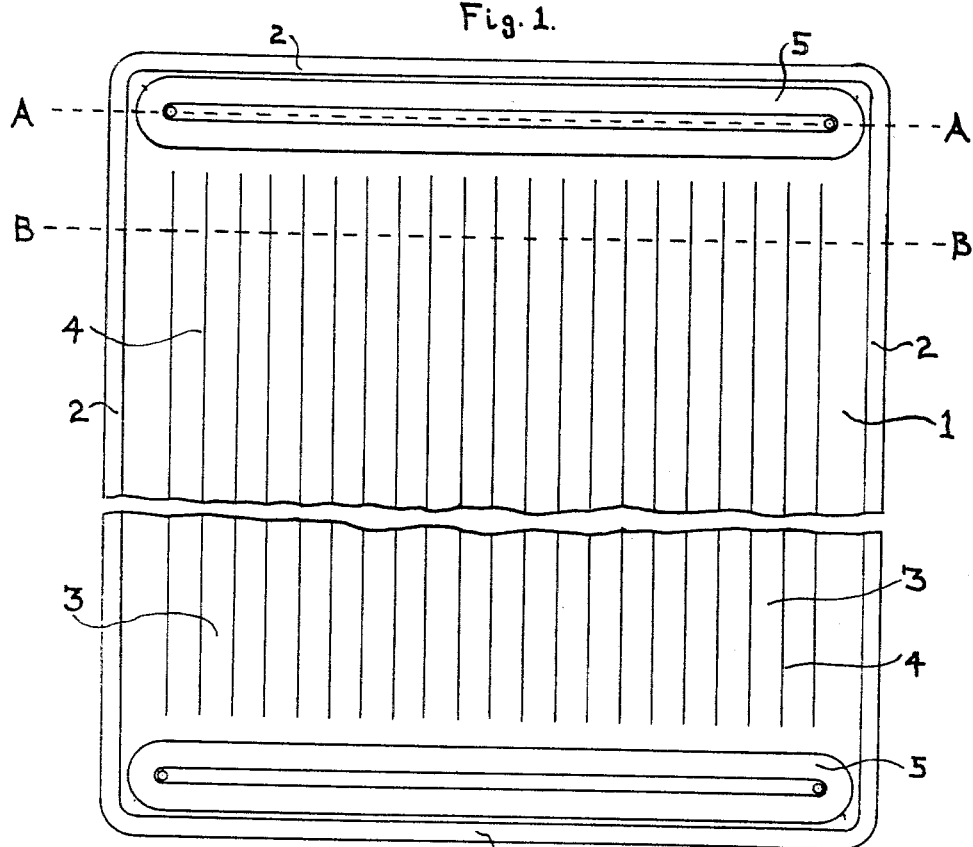
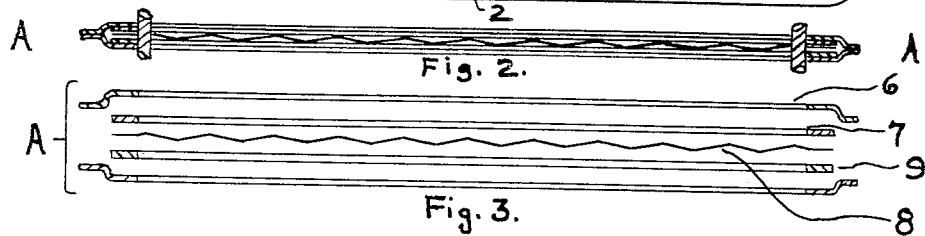
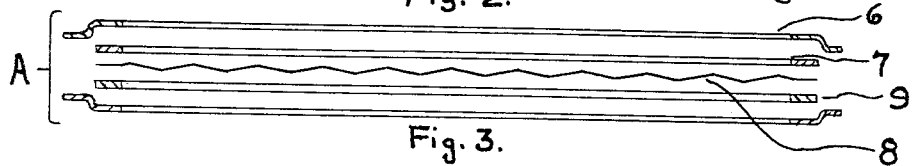

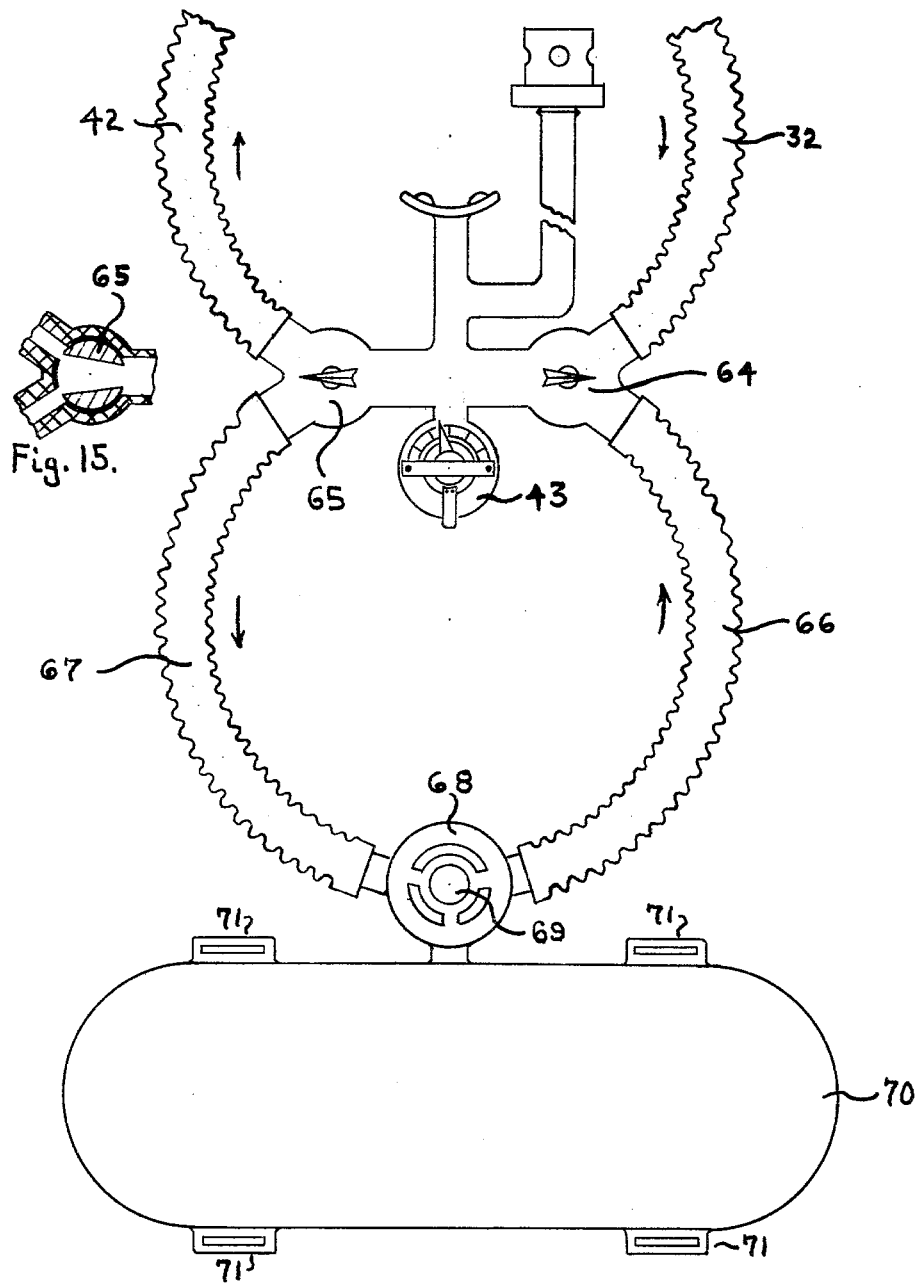

REHABILITATED AIR

*INVENTOR.*
WALDEMAR A. AYRES

BY Peck + Peck
*His Attorneys.*

United States Patent Office 3,228,394
Patented Jan. 11, 1966

3,228,394
GILL-TYPE UNDERWATER BREATHING EQUIPMENT AND METHODS FOR REOXYGENATING EXHALED BREATH
Waldemar A. Ayres, 5 Birchwood Court, Mineola, N.Y.
Filed Nov. 30, 1962, Ser. No. 242,046
18 Claims. (Cl. 128—142)

This is a continuation in part of my pending patent application, now expired, titled Gill-Type Diving Equipment, Serial No. 570,492, filed March 9, 1956.

My invention relates to equipment for underwater swimming, exploration, construction work, salvage, geologic prospecting, marine scientific studies, under water sports, photography, etc., such activities being carried on by the aid of breathing equipment being attached to the person (as "scuba") or alternatively as breathing equipment carried in underwater vessels, or in non-propelled work regions or housing spaces such as diving bells, underwater "domes," etc.; this invention particularly including methods and apparatus for rehabilitating exhaled air by extracting from it poisonous carbon dioxide and dissolving this in the surrounding water, plus extracting dissolved oxygen from the surrounding water and adding this oxygen to the exhaled air to replenish it, thus making it suitable for rebreathing, thereby providing results for people similar to the results provided for fishes by their gills. Also, in one form of the invention, results will be superior to those fishes can attain, whereby when in polluted water, or water deficient in dissolved oxygen, operation of a mixing valve can provide fresh breathable gases from a separate supply, in any desired proportion to the gill-processed exhaled air, where a fish which cannot do this would suffocate and die.

This is one of the oldest dreams of mankind. Throughout human history men have enviously watched the fishes swimming serenely at various depths in streams, lakes, and in the ocean, "breathing" by the use of their gills, and men have longed for some way to devise gills, or their equivalent, for themselves. In the centuries of development and use of underwater swimming and diving equipment, or in underwater vessels, etc., no one before has attempted and succeeded in providing any equivalent to fishes' gills, whereby dissolved oxygen is extracted from the water, and whereby carbon dioxide, one of the poisonous waste products of metabolism, is disposed of by passing it into solution in the water.

To the best of our knowledge, all previous diving equipment depends upon taking air or oxygen down to the diver, either taking it with him when he descends, or pumping it down to him.

When the diver has the air pumped down to him the air hoses limit his area of free movement, and also the hoses often become entangled, leading to accidents which have caused many deaths. Furthermore, the diver at all times is completely dependent on the men and equipment at the surface for continuously supplying his air. If they fail, he dies.

In recent years, equipment for the free diver (scuba), wearing tanks of compressed air or oxygen, has become highly developed. Elimination of entangling air lines, and the complete freedom of movement thus provided has proved of great advantage for many types of diving work and sports. However, when the compressed air or oxygen in the tank is used up, the diver must return to the surface. Also such compressed air is expensive. One published statement, even several years ago in this growing field, was that "some 7 million U.S. skin divers buy 15 tanks full a year at $1.50 a tankfull totaling over $150,000,000 a year."

In all types of diving equipment heretofore, no one else has provided means for utilizing the dissolved oxygen in the water for respiration. That is the fundamental aim of this invention.

Extensive study of authoritative technical literature in various related fields has been one important part of the development of this invention. The following have proved to be useful sources of information on various aspects of the physiology, the physics, and the chemistry of respiration in men and in various other animals, especially including fishes; and various facts cited by them are used in this invention:

Cooperative Animal Physiology, by Clifford Ladd Prosser, and others; Anatomy of the Chordates, by Charles R. Weichert; Studies of the Structure and Development of Vertebrates, by Edwin S. Goodrich; Human Physiology, by Bernardo Housay; A History of Fishes, by John R. Norman; A Guide to the Study of Fishes, by David Star Jordan; The Study of Fishes, by Albert C. L. Gunther; Biological Physics and Chemistry of the Sea Water, by W. B. Harvey; Men and the Chemical Elements, by J. Newton Friend; Encyclopedia of Chemical Technology; Hackh's Chemical Dictionary.

A basic principle of respiration for nearly all species, including both men and fishes, is the passage of oxygen and carbon dioxide through thin membranes. In fish, oxygen dissolved in the water passes from the water, thru the thin membranes of the gills, and into the blood stream of the fish. At the same time, the excess $CO_2$ in solution in the fishes' blood in the gills, passes thru the same thin membrane in the opposite direction and out into the sea water, where the $CO_2$ is dissolved in the water.

In human lungs, the oxygen of the air passes thru the very thin membranes of the lungs and into the blood stream, where it is taken up by the hemoglobin of the red corpuscles. At the same time, the excess $CO_2$ carried by the blood passes out thru the thin membranes of the lungs into the air of the lungs, where it is then exhaled.

In providing, for men, equipment which will extract oxygen from the water in a manner comparable to the gills for fish, we will first ascertain what principles of physics and chemistry we can utilize.

In all the data studied, the passage of oxygen from one liquid (such as water) thru a membrance (such as the gills of fishes) into another liquid (such as the fishes' blood) follows the laws of partial pressures of gases in relation to permeable membranes. That is, the gas moves from the region where it is at a higher partial pressure, thru the membrane, into fluid where it is at a lower partial pressure.

The same physical laws apply in the action of human lungs. Oxygen in the air in the lungs, called alveolar air, is at a greater partial pressure than in the venous blood, so oxygen from the alveolar air migrates thru the permeable membranes of the lungs into the blood stream.

Carbon dioxide follows these same laws. In men, the partial pressure of carbon dioxide is higher in the venous blood stream than in the alveolar air, so the $CO_2$ in the blood migrates thru the permeable membranes of the lungs into the alveolar air and is exhaled.

Also in fish, the $CO_2$ in the blood stream returning to the gills (venous blood) is at a higher partial pressure than in the water in which the fish is swimming, so the $CO_2$ passes from the blood stream, thru the permeable membrane, and into the water where it is dissolved.

In the system disclosed in this invention, we provide a series of pressure gradients for both oxygen and for $CO_2$, so that these two gases will move independently but simultaneously in the directions we want, by following these same laws of partial pressures of gases in relation to permeable membranes. The series of pressure gradients for oxygen are as follows:

As stated by W. H. Harvey in Biological Chemistry and Physics of Sea Water, "The surface layers of the sea are nearly at equilibrium with the air in regard to both of these gases (oxygen and nitrogen). The weight or volume at N.T.P. (normal temperature and pressure) of dissolved oxygen per liter of water varies with the temperature of the water, but the pressure is usually in the neighborhood of 159 mm. (of mercury—Hg), as it is in water saturated with air at normal barometric pressure." From this, it is established that we start with oxygen dissolved in fresh water or sea water at approximately 159 mm. of Hg pressure.

As will be described in detail later, our equipment will include a substantial area of man-made permeable membrane material permeable to both oxygen and carbon dioxide. One side of this membrane material will be immersed in and in direct contact with the fresh water or sea water in which the user is submerged. The other side of the gas permeable membrane material will form part of the breathing circuit of the equipment which leads directly into the user's lungs. For the next step, we find in Comparative Animal Physiology, by C. L. Prosser, the following information: "In the lungs of men, the blood is exposed to oxygen at a partial pressure of approximately 100 mm. of Hg (in alveolar air). When the blood leaves the lungs it carries 19 volumes percent of oxygen at 80 mm. of Hg and 96% of its hemoglobin is saturated. In the capillaries the blood passes thru tissues (elsewhere in the body) where the oxygen pressure is low (5 to 30 mm. Hg). Here 25%–30% of the oxygen is unloaded, and venous blood returning to the heart carries 14 volumes percent of oxygen at about 40 mm. of Hg pressure." The information in this quotation is important because it establishes the approximate partial pressure of oxygen in the venous blood returning to the lungs in man, as being 40 mm. of Hg. According to the laws of gaseous diffusion we are utilizing, any oxygen pressure higher than 40 mm. of Hg in the lungs will cause oxygen to migrate thru the lung membrane and reoxygenate the venous blood. The higher the oxygen pressure in the lungs above 40 mm., the faster this reoxygenation will take place.

In our system, we will provide fresh water or sea water having dissolved oxygen at approximately 159 mm. of Hg pressure. This oxygen will pass thru the permeable membrane we provide, probably with a slight drop in pressure. We note, from the data quoted, that the pressure of oxygen going from alveolar air in the lungs thru the lung membrane, and into the blood stream drops approximately 20 mm. If the pressure of oxygen dissolved in the sea water (159 mm. of Hg) drops by a comparable amount in passing thru the man-made permeable membrane we shall provide, the oxygen in the breathing circuit would be approximately 139 mm. pressure. Since alveolar air normally contains oxygen at only 100 mm. of Hg, and since any pressure above 40 mm. of Hg will carry on oxygenation of the blood, it is apparent that our system clearly will provide the basic conditions necessary for extracting oxygen from the sea water and using it for respiration. This pressure gradient series for oxygen may be reviewed and summarized as follows:

We start with fresh water or sea water containing dissolved oxygen at aproximately 159 mm. of Hg. This oxygen then passes thru a man-made membrane into the breathing circuit of the apparatus at a slightly reduced oxygen pressure. Any pressure above 40 mm. will cause oxygen carried into the lungs to pass thru the lung membranes into the blood stream and the higher the oxygen pressure in the lungs the faster the reoxygenation of the blood will take place. It is apparent that there is a great deal of latitude for oxygen pressure to drop in passing thru the man-made permeable membrane, because we have 159 mm. on one side of it, and anything above 40 mm. on the other side causes reoxygenation of blood to take place. Also, 100 mm. of oxygen in the alveolar air is all that is necessary for ordinary breathing of air directly.

The other basic requirement is that the system dispose of the $CO_2$ of the exhaled air. In Comparative Animal Physiology by C. L. Prosser and others, we find this information: "The $CO_2$ in the blood of men for arterial blood is at a pressure of from 40–42 mm. of Hg, and for venous blood is at a pressure of 45–47 mm. As compared with this, the $CO_2$ pressure in sea water is 0.23 mm. of Hg." We are concerned with the venous blood—at 45–47 mm. of Hg. Its pressure relative to the 0.23 mm. of Hg in sea water provides a tremendous pressure gradient—the higher pressure is over 18,000% greater than the lower pressure. There is no question that $CO_2$ from the venous blood would migrate thru the lung membrane into the breathing circuit of the apparatus and then thru the man-made permeable membrane into the sea water where it would be dissolved.

The soundness of these principles has been proved by successful tests, repeated for witnesses and for photographing, where I demonstrated test equipment I designed and built, whereby, for a substantial period of time, I exhaled into and inhaled from a closed breathing circuit where my exhaled breath and $CO_2$ extracted from it and was dissolved in sea water, and where dissolved oxygen was extracted from the sea water and replenished my exhaled breath, and I rebreathed such rehabilitated air over and over again.

A principal object of this invention is to extract dissolved oxygen from the water and add it to the exhaled breath, and extract $CO_2$ from the breath and dissolve it in the water, and return the oxygen enriched and purified breath for rebreathing.

A further object is to provide means whereby the pressure of the air breathed by the user is automatically made equal at all times to the pressure of the sea water, even though the water pressure varies greatly because of the different depths at which the user may be submerged.

Another object of the invention is to provide means, in one form of the apparatus, whereby if the swimmer enters polluted water, or water containing insufficient dissolved oxygen, he will not be injured or killed, as often happens to fish in such circumstances, but will be able to partly or entirely switch to a reserve supply of breathable gas until he returns to water of normal composition.

Another object of the invention is to provide a unit which we shall call a "Gill Respirator," the function of which will be to recondition exhaled air thru disposing of excess $CO_2$ by dissolving it in the water in which the user is immersed, and also by extracting dissolved oxygen from the water and releasing it in the gas stream to be breathed by the user.

Another object, in two forms of the invention, is to provide control of the buoyancy of the swimmer and the apparatus he is using.

Another object is to provide means whereby water which may have leaked into the system may be readily removed from it.

Another object is to prevent foreign objects from entering the gill unit and damaging it or interfering with its operation, thereby performing the functions comparable to those performed by the "gill rakers" in the gills of fishes.

Another object of the invention is to provide methods and means for circulating water across the gas permeable membranes to enhance the reoxygenation operation.

Another object of the invention is to provide the method of rehabilitating the exhaled air of a person in an undersea vessel, or other underwater housing, work space, or living space, by extracting dissolved oxygen from the water in which he is submerged and replenishing said exhaled air with said extracted oxygen for rebreathing.

Another object of the invention is to provide the method of rehabilitating the exhaled air of a person in an underwater vessel, or other underwater housing, work space, or living space, by extracting carbon dioxide from said exhaled air and dissolving it in the water in which the person is submerged.

Other objects and advantages of the invention will be apparent during the course of the following description.

FIGURE 1 is a plan view of a gill respirator element.

FIGURE 2 is a cross section of FIGURE 1, taken along the line A—A, showing the construction of a spacer element adapted to pass air from a main supply thru the individual channels of a gill element.

FIGURE 3 is an exploded view of the elements in FIGURE 2, provided to show that construction more clearly.

FIGURE 4 is a cross section of FIGURE 1 taken along the line B—B, and includes similar cross sections of two additional gill respirator units showing their arrangement when assembled.

FIGURE 5 shows a side elevation partly in fragmentary cross section, showing the assembled gill respirator unit.

FIGURE 6 shows a perforated member used in construction of valve means which are part of the gill respirator unit.

FIGURE 7 shows a fragmentary view of such a perforated member with the rubber valve flaps cemented in place.

FIGURE 8 shows a fragmentary enlarged view of edge stiffener members, arranged in the position they occupy in the assembled gill respirator unit.

FIGURE 9A shows a portion of one stiffener member flat, before it is bent and installed.

FIGURE 9B shows an end view of this same strip.

FIGURE 9C shows how the strip is bent prior to being installed.

Figure 10:
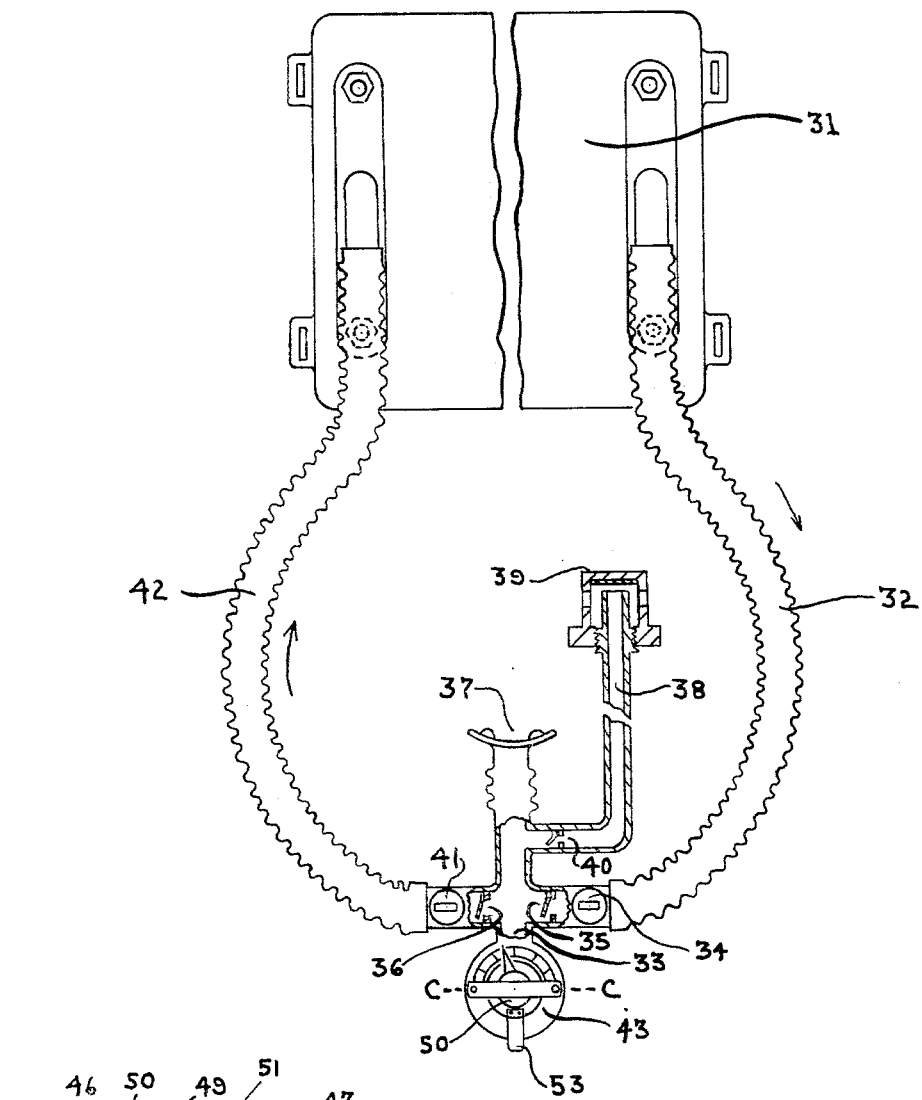
FIGURE 10 shows a plan view of an assembled gill respirator unit coupled by flexible air hoses with a mouthpiece, snorkel and various valve controls constituting a complete diving equipment suitable for extracting oxygen from the sea water and dissipating $CO_2$ into it when used by a swimmer under water.

FIGURE 14 shows another alternative view of the invention, similar to that shown in FIGURE 10 but with the added feature of a compressed air supply including a conventional "demand regulator," and also including valve means whereby a user may obtain a desired mixture of new air, with reoxygenated air, or, if desired, can switch entirely to new air, as in the case where he may find himself swimming in polluted water.

FIGURE 15 shows a cross section view of one type of proportioning valve, two such valves being used in the system shown in FIGURE 14.

Figure 16:
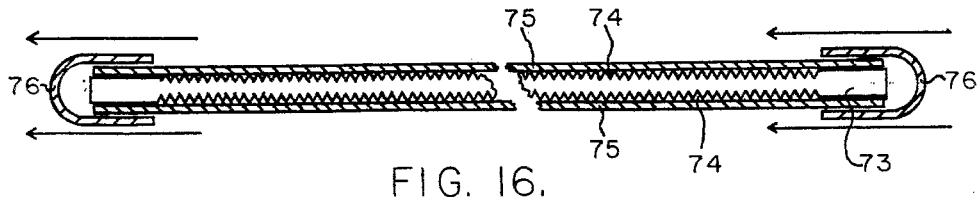

FIGURE 16 shows a fragmentary cross section, comparable to FIGURE 4, of an alternative type of construction for gill respirator elements.

Figure 17:
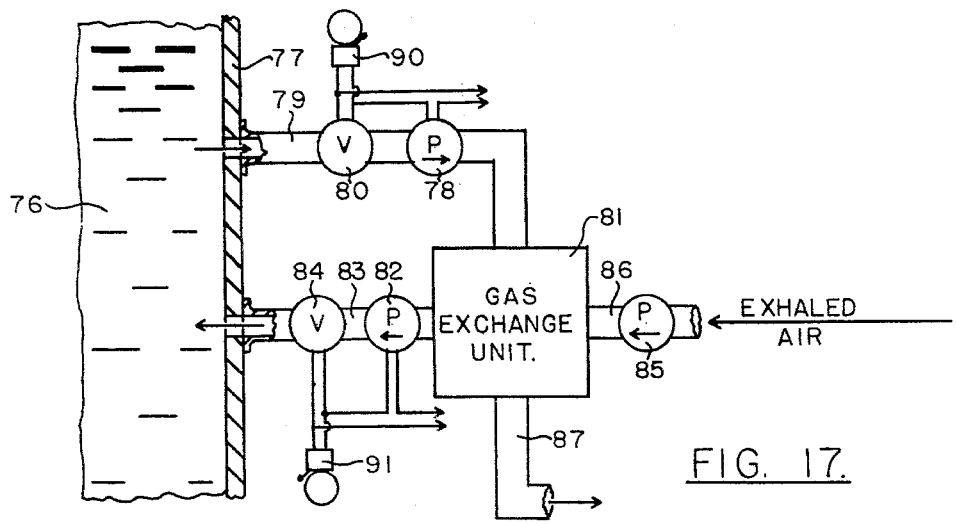

FIGURE 17 is a process diagram for methods of rehabilitating the exhaled air of one or more persons in an under water vessel, other housing, work space, or living space.

Figure 18:
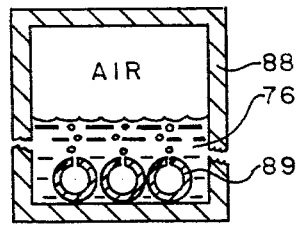

FIGURE 18 is a diagrammatic cross sectional view of one type of gas exchange unit of the system shown in FIGURE 17.

Referring to the drawings:

In FIG. 1, 1 generally is an individual gill respirator element. The completed gill respirator unit will contain a large number of such individual elements in order to provide a large number of square feet of surface of gas permeable membrances thru which oxygen from the water surrounding the driver may pass into the air breathing circuit and, at the same time, carbon dioxide may pass from the air breathing circuit into the sea water where it will be dissolved.

Permeable membranes for the gill respirator elements may be made from any one of a variety of materials. The one selected should have a preferred combination of qualities such as the ability to pass oxygen, ability to pass carbon dioxide, low absorption of water, reasonable dimensional stability, good mechanical strength (particularly tear strength), good characteristics for being sealed or cemented to itself or to other materials either by heat or adhesive or other appropriate means, and reasonable cost. The first requirement is that the material chosen should have good ability to pass oxygen and $CO_2$.

In response to our inquiry, written to E. I. Du Pont de Nemours & Co., Inc., their polychemicals department sent us a copy of an article titled "Permeability of Polymeric Films to Gases" by V. L. Simril and A. Hershberger, published in the July issue of "Modern Plastics." This is a technical report of studies made of "The permeabilities of 21 polymeric films to oxygen, hydrogen, carbon dioxide, nitrogen, ammonia . . . etc." In this article, "all gas permeability data obtained in this study are reported here in terms of the permeability constant P which is defined as the number of moles of gas passing thru one square centimeter of film, one centimeter thick, per second per centimeter Hg vapor pressure difference across the film." Several of these materials show high permeability factors which are expressed as $P \times 10^{17}$. Table 5 shows Glycerol V as having an oxygen permeability of 546, and a $CO_2$ permeability of 754. Table 7 shows Vinyl Butyral as having an oxygen permeability of 464, and a $CO_2$ permeability of 2280. The same table shows polyethylene (ethylene polymer) at 100% relative humidity (this is appropriate because the film we use will be immersed in water) as having an oxygen permeability of 839 and a $CO_2$ permeability of 3820.

The same table shows ethyl cellulose (48.3 ethoxyl) plasticized with 15% of butyl phthalyl butyl glycolate at 0% relative humidity having an oxygen permeability factor of 3470 and a $CO_2$ permeability factor of 21,200. At 100% relative humidity the oxygen permeability is not given but would probably be higher than 3470 and the $CO_2$ permeability factor is given as 22,500.

The article includes in its summary the further information that, "In general, it may be said that gas permeation increases with any increase in the bonding forces between polymer molecules of the film and with any increase in the attractive forces between film and gas. Thus, highly polar, strongly bound polymers are less permeable to non-polar gases than are the less polar, weakly bound polymers. The introduction of side chains onto the main polymer chains, the introduction of plasticizers, and the presence of water, all tend to increase permeability."

From another source, The Journal of Thoracic and Cardiovascular Surgery, November 1960, we learn information on other tests on the comparative ability to pass various sheet materials to pass oxygen, carbon dioxide, and carbon monoxide. In these test results, altho the sheets tested were of varying thickness as produced commercially, the calculations took this into account compensating for these different thicknesses, and thereby provides comparative permeability coefficients of the materials themselves, independently of thickness. Also the investigators found that the ratio of permeability for carbon monoxide, carbon dioxide, and oxygen "is relatively constant for almost all membranes." All three are given in the following table of permeability coefficients.

| Membrane | CO | O₂ | CO₂ |
| --- | --- | --- | --- |
| Polyvinyl chloride | 1.2 | | 12 |
| Polyethylene | 2.5 | 4.1 | 18 |
| Cellulose acetate butyrate | 3.2 | | 35 |
| Tetrafluoroethylene (Teflon) | 5.8 | | |
| Natural rubber | 18 | 32 | 163 |
| Silicone rubber | 375 | 650 | 3,400 |
| N.P. Pormax (microporous plastic) | 13–16,000 | | |
| E. P. Pormax | 15–25,000 | | |
| Micro-Pormax | 22–40,000 | | |

From this, it will be seen that various different materials may be used as the gas permeable membrane and this invention specifically includes any suitable membrane material.

This invention also includes a structure employing no membrane at all, as illustrated by the following. There are a number of instances in nature where various living creatures utilize the migration of dissolved oxygen in water into an air space provided by a submerged air bubble, trapped under water, without the use of any permeable membrane or anything comparable to it. Also, in these same situations, $CO_2$ given off by the living creature passes from the air space into the surrounding water where it is dissolved without any permeable membrane being employed.

For example, in an article entitled "Insect Breathing" by Carroll M. Williams, and published by the Scientific American, February 1953, the following information is included: "The diving bell insects take oxygen along with them when they submerge. The 'bell' consists of a bubble of air collected at the water's surface and held on one or more points of the body. During the dive the insect sucks oxygen from the bubble. Students of the phenomenon were long puzzled by the fact that the insect can stay under water long after it should have exhausted the bubble's oxygen content. The puzzle finally was unraveled by the Danish physiologist Richard Edge. He found that the bubble can serve as a veritable under water lung. As the oxygen pressure in the air-filled bubble falls below that of the oxygen dissolved in the surrounding water, oxygen from the water diffuses into it. The insect can remain submerged until the nitrogen that keeps the bubble inflated diffuses into the surrounding water. So, strange as it may seem, the most important ingredient in the bubble of air which the insect picks up at the surface is nitrogen, not oxygen. The nitrogen, which makes it possible to use the bubble as a lung, allows the insect to be submerged 13 times as long as an equivalent bubble of oxygen would permit."

The last sentence shows migration of oxygen from the water into the air space and of carbon dioxide from the air space into the water occurs without any permeable membrane being necessary and enables the insect to breathe under water 13 times longer than he otherwise could, and the earlier part of the paragraph indicates that even this limit is due only to the air space ceasing to exist because of the nitrogen also diffusing away into the water. This indicates that if we provide means whereby the air space can be maintained, the oxygen can be extracted from the water and carbon dioxide disposed of by dissolving it in the water even if we do not use a permeable membrane. It is important that we distinguish here between a permeable membrane and a porous membrane, sheet, or barrier. A "permeable" membrane, sheet, or barrier will be understood to mean a continuous sheet of material (that is, homogeneous) as cellophane is continuous, or most plastic sheet materials, and as our lung membranes are continuous, and fishes' gills are continuous, even though all of these may be penetrated at various rates by the separate molecules of gases and vapors. We are told that such penetration by gases is believed to be thru intermolecular spaces of the membrane material similar in size to the gas atoms but somewhat larger—generally the same order of magnitude. In contrast to this permeable material, "porous" materials are discontinuous, having openings, pores, interstices (as between paper or cloth fibers) or other discontinuities of cross section, such pores usually being thousands or millions of times larger than the gas atoms we are concerned with. Either permeable or porous materials can be used for this invention, but different factors are involved.

Certain well known previous experience indicates that one method of extracting oxygen without using a permeable membrane would be to use a closely woven material, such as cloth, or to use wet strength paper, or perhaps very fine wire screening, or perhaps sheet metal or plastic perforated with a very large number of very small holes. In the old fashioned "water wings" for swimming, use was made of ordinary woven cloth which, when saturated with water, prevented the air from going out thru the pores between the fibers, even though the water wings were subjected to very considerable pressure due to the weight of the person being supported in the water. The fundamental force involved in this situation is the surface tension of the water, which becomes comparatively quite high when the dimensions of the openings involved become very small. The surface tension in this case caused the water saturating the cloth to bridge the gaps between the cloth fibers so tenaciously that even the weight of a large person in the water was not sufficient to disrupt this water film. Another example is the experiment which can be performed using a sieve made of closely woven wire screen. If the screen is first wet with oil, then water, if carefully placed within the sieve, can actually be carried in the sieve, whereas normally, of course, the water would run right thru. Here again the surface tension of the water is the primary operating force. Because of the repellance between water and oil, the water cannot wet the sieve, and because of the small holes between the wire mesh of the sieve the surface tension of the water prevents it from flowing thru.

In a similar manner, this invention includes the use of sheet material, whether woven, or perforated, or otherwise of porous composition, having a large number of very fine openings which will enable water to bridge these openings without flowing thru them. In the case of cloth, the sheet material ordinarily would be saturated with water. However, an alternative would be to treat the cloth with a water repelling material such as an oil or wax, in which case the cloth would not be saturated with water. Alternatively, sheet material such as plastic or metal, or any other appropriate material might be made with a very large number of very fine openings where the surface tension of the water would bridge these openings but would not flow thru. In these forms of the invention the water itself would be exposed to and in direct contact with the air in the air breathing circuit of the apparatus to be described and the migration of oxygen from the water into the air circuit and of $CO_2$ from the air circuit into the water would follow the same physical laws as those utilized by the insects in the article quoted. The construction of the gill respirator could be the same, regardless of whether porous materials or permeable membranes are used and FIGURES 1–8 and FIGURE 16 and the associated specification apply to both types of materials.

However, the apparatus described in detail hereafter, for purposes of illustration, makes use of permeable membranes and these act in the same way and follow the same physical laws as the permeable membranes in the lungs of men and the gills of fishes, as subsequent discussion will explain, but this illustration is not limiting, and porous materials may be used, or other means for accomplishing the "Objects."

In FIGURE 1, the gill respirator element is formed of two sheets of permeable membrane material, heat sealed or cemented, or otherwise secured together by any appropriate means, all the way around its edges as as shown at 2, 2, 2, 2. Subsequently, in this description, the term heat sealed will be used, but it is to be understood that cementing or any other appropriate means for securing plastic to itself or to other materials is included in this invention. The respirator element 1 is a basic type of unit whereby air contained within it may pass excess $CO_2$ thru the permeable membrane into the surrounding water, and whereby, in the opposite direction, oxygen from the outside water may pass into the breathing circuit.

It is desirable to provide a maximum amount of surface area between air, permeable membrane, and the water, in as small a cubic space as possible. With this aim in view, a large number of passageways 3, 3, are formed by heat sealing together the two surfaces of the gill respirator envelope 1 along the lines shown, two of which are designated as 4—4. Because small passageways provided substantial resistance to the flow of air, it is desirable to design a unit which consists of such passageways utilized in parallel, whereby such resistance is very greatly reduced. It is also necessary to supply air exhaled by the user to one end of the gill respirator element and collect reoxygenated air from the other end of the gill respirator element and to conduct this air back to the user to be rebreathed. The two elements 5, 5 in FIG. 1 are important in performing these two functions, and are identical in construction.

FIGURE 2 shows a cross section of one of these units taken along the line A—A in FIG. 1 and the portions of this unit are shown exploded in FIG. 3. In FIG. 3, 6 is the top sheet of permeable membrane. 7 is one of two elongated washers stamped out of thin sheet material, such as non-corrodable metal, or stiff plastic sheet material. 9 is a second elongated washed identical with 7, whereas 8 is a corrugated elongated washer having the same over all dimensions as 7 and 9 but, due to its corrugations, 8 acts as a spacer and separator holding 7 and 9 apart and also provides air passageways thru the cross section of the assembled group 7, 8, and 9.

In regard to their manufacture, by way of example, 7, 8, and 9 may be made of thin sheet brass or stainless steel. 8 may be dipped into a plastic adhesive material which will become thermosetting upon the application of appropriate heat. The washers 7 and 9 could be assembled with the spacer 8 between them in a heated press whereby heat would be transferred thru the washers 7 and 9 to the corrugated separator 8 and the plastic adhesive coating on separator 8 would be softened by the heat and then changed into its permanent thermosetting adhesive form, whereby the washers 7 and 9 would become a permanent unitary subassembly. This is a very feasible manufacturing procedure and large numbers of such subassemblies could be made at comparatively low cost.

The next step in the manufacture of the gill respirator element 1 would be to utilize an hydraulic press with platens which could be heated and cooled, and in which a suitable pair of dies would be mounted for performing the following procedure. With the dies cold and separated, one sheet of permeable plastic membrane would be laid on the bottom platen. Over this and in proper register would be placed the two elongated washers 5, 5 in the form of the previously described subassemblies. On top of these two would be laid a second sheet of plastic permeable membrane material. The platens of the press would then be closed and the platens would be heated and then cooled to perform the heat sealing already described. This heat sealing would also secure the permeable membrane to the surfaces of the elongated washer subassemblies 5, 5. After the press had cooled, the gill element would be taken out of the press and the plastic permeable membranes would be cut out where they stretch across the inner openings of subassemblies 5, 5. This would complete the manufacture of a gill respirator element 1.

It will be seen that this will produce a standard sealed unit having two large surfaces of permeable membrane material formed into a large number of parallel channels used in parallel and including two separator elements 5, 5 to which air may be applied thru the elongated center openings and then thru the air passageways formed by the corrugated separators.

It is a matter of choice and experiment as to what type of permeable material is used; as to how thin the sheet should be to obtain, on the one hand, maximum gas permeability, which generally will increase as the film used is thinner, while at the same time maintaining good mechanical strength which, of course, would be greater as the film is thicker.

It is even possible, if desired, to make films which are exceedingly thin. One method is to release, under water, a plastic lacquer, lighter than water, which will immediately rise to the surface and spread out in the same manner that oil spreads on water. As the solvent of the lacquer evaporates, this film will harden and, with care, can be lifted off the surface of the water intact. This film can be made so thin that it is comparable to the thickness of a film of oil on water or the thickness of the wall of a soap bubble. These films have a thickness probably in the order of $1/100{,}000$ of an inch or less and probably are considerably thinner than it would be necessary to use this apparatus, altho they would be quite possible to use.

Thin films may be secured to an open mesh or net material, such as metal or plastic screen, to provide very much enhanced mechanical strength. I have already done this successfully with very thin plastic films adhered to plastic window screen.

It is expected that a probably good compromise of design characteristics would lie in the choice of films in the order of $1/1{,}000$ of an inch of thickness. Some recently developed films of such thickness made of polystyrene are said to have good oxygen and $CO_2$ permeability, and would have the further advantage that they absorb practically no water. Silicone rubber has also been recommended because of its high oxygen permeability.

Another factor which is important in the design of the gill respirator unit is the amount of time the exhaled air will be inside the permeable membrane material and undergoing reoxygenation. Clearly, the longer this exposure time can be, the greater the amount of reoxygenation that can take place. Also, if this exposure time can be made longer it may be preferable to do so as a means of decreasing the number of gill elements or of decreasing the area of each gill element, or both. In this invention, I have devised a principle for increasing the exposure time for reoxygenation which is a principle not utilized in the gills of fishes nor in the lungs of human beings.

By experiment, I have found that the volume of an average inhaled breath is in the neighborhood of 40 cu. inches. In the gill respirator and the associated breathing circuit disclosed in this invention, two check valves are employed so that air in the breathing circuit always progresses in the same direction. Also, the volumetric capacity of the parallel passages of the gill respirator unit is purposely made several hundred percent greater than the average breath exhaled by the diver. The result is that for any unit of exhaled air to pass completely thru the gill respirator unit, it will take the time of a number of complete breathing cycles of the diver. The utilization of these principles provides an increase in the reoxygenation effectiveness of several hundred percent. For example, if we use a gill respirator element 18″ square its two sides will provide 646 sq. in. of gas permeable surface. If it is made of sheeting $1/1{,}000$ of an inch thick, when deflated its thickness will be $2/1{,}000$ of an inch thick; when normally inflated to its usual partially inflated capacity, we may allow $1/16''$ of thickness. We may also decide to allow 3/16" water space between each of the gill respirator elements. Then, a gill respirator assembly containing a 12" stack of 18" by 18" elements would have 48 such units and would provide approximately 216 sq. ft. of gas permeable membrane exposed to the surrounding water. Further, if we assume that the flattened oval cross sections of the passages of the gill respirator units occupy approximately 1/2 the volume that a continuous separation of the 1/16" between the sheets would provide, then the assembly of 48 gill respirator units would provide an approximate volumetric capacity of 480 cu. in. Since an average exhaled breath was found to be in the neighborhood of 40 cu. in., it is seen that the estimated volumetric capacity of the gill respirator unit could be in the neighborhood of 1200% greater than the volume of an average exhaled breath. This would indicate that it would take approximately 12 exhaled breaths to move any unit of exhaled air completely thru the gill respirator unit. Checking the time of an average breathing rate indicates that it may be in the neighborhood of 16 complete breathing cycles per minute. Applying this breathing rate to the 12 cycles resulting from previous assumptions, we find a total exposure time of approximately 45 seconds for any unit of exhaled air during which it is exposed to reoxygenation. This is a very much more favorable kind of condition than exists for human breathing. In the lungs of man, the oxygenation of the inhaled air must take place in approximately 1/2 the complete breathing cycle, or, according to the preceding average figures given, in less than 2 seconds. Thus we may obtain an improvement, as compared with human lungs, of more than 2250%, in regard to the exposure time available for reoxygenation in the gill respirator unit.

It will be informative to make a comparison between the factors contributing to the extraction of oxygen by the gill respirator unit as compared with the extraction of oxygen from the alveolar air in the lungs of man. Generally speaking, we can utilize the assumption that the oxygenation function will be the permeable member area times the time system provides for reoxygenation, other things being equal. In the book "Human Physiology" by Prof. Bernardo Housay, we find the information that "The total surface of the alveoli (lung tissues) has been calculated to be between 80 and 100 square meters in man. The walls are sufficiently thin and permeable to allow for rapid interchange of gases." (However, Dr. Genero of the University of Florida Medical School, whom I interviewed checking out the medical aspects of this invention, showed me a more recent medical reference where the lung area has been recalculated with the finding of "8 to 10 square meters"—one tenth the former calculation. However, even using Housay's figures to be ultra conservative, we find the following favorable circumstances.)

Since a square meter is approximately a square yard, we may figure (using Housay's 80–100 sq. meters) that the area of the lungs in man has been calculated as being from 720 to 900 sq. ft. We will average these two figures using 810 sq. ft. If we multiply this by the approximate two seconds during which the breath is inhaled in an average breathing rate, we get 1,620 square-foot-seconds of lung exposure for reoxygenation. It is useful to employ this new measure of "square-foot-seconds" for the purpose of making comparative calculations of reoxygenation devices in this new field of designing gill respirators for extracting oxygen from water for breathing purposes.

If we assume the design dimensions of the gill respirator unit discussed previously having the major dimensions 18" by 18" by 12", this unit will provide an approximate permeable membrane area of 216 square feet. If we multiply this by the 45 seconds of time for any unit of air to pass thru the gill respirator unit, we find that we have an approximate 9720 square-foot-seconds of gill respirator exposure for reoxygenation. This indicates that we have an extremely promising set of possibilities since the number of square-foot-seconds for a gill respirator unit of quite moderate size, 18" by 18" by 12", appears to provide 600% more square-foot-seconds for reoxygenation than the average human lungs.

It is also a matter of design choice as to how large the gill respirator element 1 shall be made and, further, it is a matter of preference as to how many such elements may be used in an assembled gill respirator unit. Furthermore, some persons utilizing this invention may wish to employ more than one assembled gill respirator unit, depending upon their own preferences as to the most convenient size and shape of the equipment.

Figure 12:
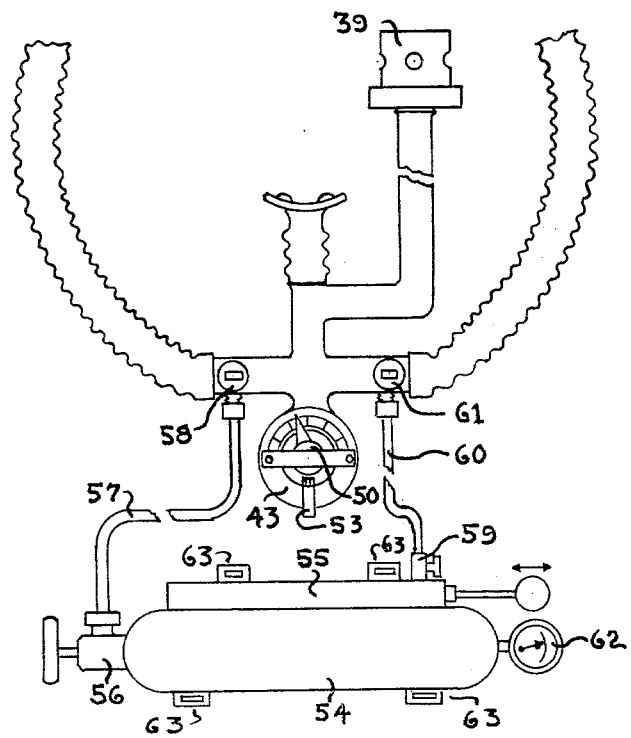
FIGURE 12 is a plan view of an alternative form of the invention including the added feature of a compressed air supply for providing control of buoyance, and for other purposes.

It should be understood that the purposes of this invention will be fulfilled by the extraction of dissolved oxygen from the water to any extent, for breathing purposes. In other words, design characteristics may be chosen whereby the resulting amount of oxygen extracted from the water acts merely to enable the prolonging of the time a diver may stay under water (as compared with holding his breath) whether he is relying solely on the gill respirator unit, as shown in the form of the invention in FIGURE 10, or whether he is using the form of the invention including an auxiliary compressed air supply as shown in FIGS. 12 and 14. Also, the purposes and principles of the invention will be fulfilled if design characteristics are utilized enabling the extraction of a greater amount of oxygen from the sea water so that the user is able to continuously breathe air which has been reoxygenated by the gill respirator unit for extended periods, without being replenished by mixture with new oxygen from a compressed air or compressed oxygen supply.

One important principle of this apparatus enabling such thin films to be used without fear of their being ruptured is that the equipment is so designed that the air pressure inside the gill respirator unit is always at precisely the same pressure as the outside water, or very, very nearly so, despite great variations in the pressure of the water in which a diver may be swimming, depending upon the depth at which he is swimming. Very closely connected to this important principle is the further fact that the gill respirator elements disclosed in this invention are capable of containing a volume of air which varies with each inhalation and exhalation of the user.

I have found by experiment that it is impossible for a human being to breathe air from the surface thru a simple tube when he is submerged, if he is more than two or three feet below the surface of the water. Analysis shows that this occurs because the air inside a person's lungs is then at atmospheric pressure, whereas water on the outside of his lungs is at a pressure considerably greater than atmospheric pressure. The human body simply does not have the muscular strength to expand the rib cage for inhalation against a pressure difference of more than two or three feet of water, balanced against atmospheric pressure. It may be taken as a basic principle for equipment of this class, that the air supplied for inhalation by the lungs must be at a pressure equal to, or very nearly equal to, the pressure of the outside water in which the swimmer is submerged. This alone, however, is not the complete answer. I have found by further experiment that if air is supplied in any reasonably small closed rigid container even at the same pressure as the outside water and is connected by a mouthpiece to the lungs that a user would find it impossible to inhale from such a container and exhale back into it, and such a container may be taken as representative of a closed system intended for circulating and breathing air. It becomes evident that a flexible bag, or other flexible container, subjected to the pressure of the sea water on the outside and carrying the air in the breathing circuit on the inside needs to be one essential part of the system. With this element included and with the water pressure pressing equally upon both the flexible container and on the rib cage of the diver, the diver's chest muscles are again effective in expanding the lungs for inhalation, whereupon the flexible container of air is correspondingly compressed. Upon exhalation, the reverse occurs. The muscles of the chest contract the rib cage applying a slightly greater pressure to the air contained in it and the exhaled air passes to the flexible container which expands by a corresponding amount. Since the outside water presses equally on the flexible air container and upon the rib cage of the diver, his muscles can become fully effective in the ordinary breathing movements. Also, because his air container has a flexible structure, the air contained in the breathing circuit at all times is at precisely the same pressure as the outside water for the simple reason that the outside water compresses a flexible container of air until the pressure of the air inside is at equilibrium with the pressure of the water. It will be noted that in all three forms of the invention disclosed in this patent application, these essential principles are embodied.

In regard to the gill respirator elements in particular, the air passageways formed by the parallel lines of heat sealing are normally quite flat ovals in cross section. As the diver exhales and additional air flows into the breathing circuit thereby, the slight added air pressure will cause these passage ways to become more rounded ovals in shape, thereby increasing their volumetric capacity. Conversely, when the diver inhales and air is withdrawn from the breathing circuit, the water pressure on the outside of the permeable membranes of the gill respirator elements will cause these parallel passage ways to assume a more flattened oval shape, thereby decreasing their volumetric capacity. In this simple way, the gill respirator elements, in addition to their functions of providing oxygen and $CO_2$ exchange with the water, also provide for the breathing circuit a flexible element having variable volumetric capacity. In addition, as the diver descends into deeper water and the pressure of the water increases the flexibility of the permeable membranes will result in automatically increasing the pressure of the air in the breathing circuit by an exactly corresponding amount. Similarly when the diver swims toward the surface, and as he ascends, the water pressure decreases, the air contained in the parallel passage ways of the gill respirator unit will expand by an amount exactly sufficient to maintain the air in the breathing circuit at a pressure equal to the outside water at all times. Of course, a separate conventional flexible breather bag can be added to the breathing circuit, if desired.

In the forms of the invention shown in FIGS. 12 and 14, if use has been made of the compressed air supply while the diver was submerged, when the diver returns toward the surface, an adjustable air exit valve is provided which will automatically open and allow excess air to escape, if necessary as an aid in maintaining the pressure in the breathing circuit exactly equal to or very nearly equal to the pressure of the outside water.

FIG. 4 shows a cross section of three gill respirator elements 1 taken along the line B—B in FIG. 1. Here the flattened oval cross sections of the individual parallel passage ways of the permeable membrane material is clearly shown, as at 10. Note also the outer edges are sealed together as shown at 11 and as shown at 2, 2, 2, 2 in FIG. 1. In FIG. 4, three of the gill respirator elements are shown to illustrate clearly how they may be spaced and how the sea water may be made to flow between them, at 12, 12, 12. Means will be shown and discussed later whereby the sea water is kept moving in the same direction. At the outer edges of the gill respirator elements bent strips of metal are shown, as 13, 13. These are optional stiffener elements and their purpose will be discussed later.

FIG. 5 shows a fragmentary side elevation, partly in cross section, of the assembled gill respirator unit. A plurality of gill respirator elements 14 are stacked together between an upper end plate 15 and a lower end plate 16. These gill elements are held in register and the whole unit is held together by the tie bolts 17 and 18 which pass up thru the bottom of end plate 18, thru the opposite ends of the elongated openings of the subassemblies 5, shown in FIG. 1, up thru the upper end plate 15, thru the water tight gasket 19, and thru the respirator unit air conduit 20. The tie bolts 17 and 18 are held securely in place by the nuts 21, 21, as shown.

Refer to FIG. 10 which is a plan view of the assembled gill respirator unit. Here it will be seen that two of the respirator unit air conduits 20 are used in the parallel fashion shown. It should be understood that when a series of gill respirator units 1, of FIG. 1, are piled in a stack in register, and to this stack are added the end plates 15 and 16 and two respirator air conduits 20 are also employed as shown in FIG. 10, then air passage ways are provided as follows. Air may be supplied by a flexible hose connection as 22 in FIG. 5, and will pass through the respirator unit air conduit 20 which leads to the elongated opening provided by the stack of separators 5 of the gill respirator elements 1 of FIG. 1; air can move down thru the central opening of the stacked elements 5 and also can move in a parallel fashion thru the passage ways provided by the corrugated separator 8 of each of the subassemblies and thence thru the parallel channels formed in the permeable membranes. The air then flows out thru the corrugated elements 8 of the subassemblies 5 at the other end of the gill respirator elements 1 and flows upwardly thru the elongated openings of the stack of elements 5 and back out thru the second respirator unit air conduit 20 and thence thru a second flexible air hose.

It is desirable to cause new water to flow frequently across the permeable membranes. If the water stays motionless then the oxygen dissolved in it will soon be used up and there will only be a very small amount left for later respiration purposes. Because of this same requirement, most species of fishes have means for passing new water across the permeable membranes of their gill. Often this is accomplished by opening and closing the mouth and some species even have structures which act as valves which pump new water across the gill surfaces each time the fish closes its mouth. Particularly is this noticeable in the moray eel, which opens and closes its mouth very noticeably even when completely at rest, as a means of forcing new water across its gill surfaces.

To perform this same function, means are provided in the gill respirator unit both for pumping water across the permeable membrane surface and also, as the most efficient method, means are provided which cause such water to flow always in the same direction, so that there will be a maximum exchange of new water replacing de-oxygenated water.

In connection with this flow of water across the gill surfaces, many species of fish also are equipped with gill rakers which serve as a screen to keep out foreign objects which might interfere with the functioning of the gills or which might damage the delicate gill membranes.

In FIG. 5, coarse screen members 23, 23 are soldered to the inside faces of angle members 24, 24, 24, 24 which, in turn, are secured to the end plates 15 and 16 by the mounting screws 25, 25, 25, 25. The screen members 23 act like the gill rakers of fish, to keep out foreign bodies which might interfere with the action of the unit or damage it.

Circulation of water across the gill units is provided for in two ways. I have made extensive studies, in this connection, of the water circulation across the gill surfaces of big fish, comparable to the size of a man, particularly of big sharks at Marineland, south of St. Augustine, Florida, and at the Seaquarium in Miami. The curator at Marineland told me that the amounts of water flowing thru the gills of big fish have never been measured.

However, I have developed a way of making a useful approximation for our purposes. At the outdoor shark run at the Seaquarium it is readily possible to get within a few feet of the sharks. I studied nurse sharks there which (I was told) weighed approximately 400 pounds, as a basis for making a conservative comparison with a 175 pound man. They swam, much of the time, at approximately 1 ft. per second. It could easily be seen that they were not working their jaws in breathing, but as is common with sharks, with mouth slightly open were depending entirely upon their forward movement to pass water thru their gills. Also the gill slits did not periodically distend in a breathing rhythm, but instead maintained constant apertures.

All the water going over the gill membranes necessarily comes out of the gill slits, so all we need to do is estimate the flow at that point. This flow will be the total cross sectional area of the gill openings times the rate of flow, this flow being approximately equal to the speed of the fish thru the water. The gill slits averaged approximately 3 inches long, with an average opening of approximately $3/16''$ width, and these nurse sharks had 4 gill slits per side, making a total of eight. The total gill slit cross sectional area therefore was approximately 3" (height) times $3/16''$ (width) times 4 (gill slits per side) times 2 (sides), equalling a total of 4½ sq. in. cross section of water flow.

At the swimming speed of 1 ft. per second, and 4½ sq. in. of water flow, this equals 54 cubic inches of water per second, which equals approximately 14 gallons per minute.

This 14 gallons a minute is for a 400 pound shark. It might be a fraction of this for a 175 pound man.

Now compare this 14 gallons a minute for the 400 lb. shark with what we could readily provide for the man, swimming (with swim fins) at the same very slow rate of 1 ft. per second.

We have previously described a gill unit having a frontal area 18" wide by 12" high. The 48 gill units were planned at $1/16''$ thick each with $3/16''$ spaces between. The total cross sectional area of water flow will therefore be 47 spaces times 18" wide times $3/16''$ high, which totals slightly over 158 sq. in. of water flow. (Note the shark had only 4.5 sq. in. of water flow). With the gill unit having approximately 158 sq. in. of water flow, at a speed of 1 ft. per second we would have approximately 492 gallons flowing across the gill surfaces per minute. This obviously is far more than necessary. Then, from another point of view, calculating what reduced speed would provide the same flow as for the 400 lb. shark, we find that approximately ⅓ of an inch per second would do it.

This is such an extremely low speed that most bodies of water probably have at least this much water movement as their natural state, without a person having to swim at all, most of the time. However, a great many fish swim all their lives to circulate water over the gill surfaces. The nurse shark swims most of the time, but can also stop, and then pumping action thru the gills is observable.

Similarly, both methods for passing water over the gill units are provided in this invention. Swimming action will continuously hold open the valves (to be described below), while this will be supplemented by pumping action when not swimming.

Referring to FIG. 5, water which has come thru the screen member 23 next passes thru a valve unit which is comprised of a perforated plate 26, shown in FIGS. 5, 6, and 7, and a series of flexible rubber-like valve strips 27, 27, which are cemented along their upper edges to the perforated plate 26 and are mounted in an overlapping fashion resembling shingles. These valve strips are normally closed, but in FIG. 5 they are shown in a partially open position with water passing thru the spaces between them. At the right hand side of FIG. 5, after water passes thru the screen 23 into the perforated metal sheet 26 and the valve flaps 27a, it then passes along between the gill respirator elements and flows out thru the valve unit at the left and then out thru the screen at the left. Water pressure, when swimming, holds both sets of valves open continuously with water flowing right thru. When not swimming, the force which provides the pumping action is as follows. When the diver inhales and withdraws air from the breathing circuit, the volumetric capacity of the parallel channels in the gill respirator units is correspondingly reduced below the pressure of the outside water. The greater pressure of the water on the outside forces the valve flaps 27b to close and the valve flaps 27a to open, as shown at the right side of FIG. 5, so that with these open the water flows into the spaces between the gill respirator elements by an amount sufficient to make up for the volume of these elements which are reduced when the diver inhaled. Conversely, when the diver exhales, the volumetric capacity of the parallel passages of the respirator gill element increases, thereby increasing the pressure of the water between these elements to a point where this pressure is greater than the pressure of the water outside the respirator unit. The increase of pressure from the water on the inside causes the valve flaps 27a to close and the valve flaps 27b shown at the left side of FIG. 5, to open, thereby allowing water to flow outwardly and thru the screen until the pressure of the water remaining within the gill respirator unit equals the pressure of the air contained in the parallel passages of the permeable membrane units. In this way, with each inhalation by the diver, there is a flow of water into the front of the gill respirator unit, and with each exhalation by the diver there is a flow of water out thru the back of the gill respirator unit.

It is to be understood however, that any suitable means for moving water thru the gas exchange unit may be employed, as preferred. For example, an electric pump could be used, with a rechargeable storage battery for power; or the power might come from copper and zinc plates with sea water as the electrolyte forming a primary battery.

In FIG. 5, 28 is a sheet of sponge rubber or other resilient material, cemented to the bottom plate and intended to make the respirator unit more comfortable when worn by the diver.

FIGS. 8, 9A, 9B, and 9C show various details of an optional element which may be used or not as found preferable. If it is found that water flowing into the front of the respirator unit (at the right as shown in FIG. 5) tends to bend over the sealed edges of the thin flexible plastic of the gill respirator elements, and if such action tends to close off these channels unduly, then stiffener elements, described below, may be utilized to hold the edges of the respirator elements in a preferred spaced and separated relation.

FIG. 9A is a plan view of part of one of the stiffener elements 29. This may be made of a thin strip of non-corrodable material, such as thin sheet brass, or stainless steel. It is shown in end elevation in FIG. 9B. This strip carries small rounded raised portions 30 which will serve as spacers. In the manufacturing process, each strip 29 will be bent as shown in FIG. 9C and will be laid along one of the heat sealed edges 2 of the gill respirator elements 1 of FIG. 1. Then the metal strip 29 will be bent closed so that it grips both sides of the heat sealed edge as shown at 13 in FIG. 4. When these strips have been added to the gill respirator elements 1 of FIG. 1 and these elements have been assembled in a stack, their edges will appear as shown in FIG. 8. Here it is clear that the raised portions 30 will act as spacer elements reliably separated, thereby providing adequate spaces for the passage of water therebetween.

FIG. 10 is a plan view of a complete underwater breathing system utilizing the previously described gill respirator unit. Part of this diagram is fragmentary, showing in cross section some of the construction of the breathing circuit. The gill respirator unit, generally designated as 31, is connected by a conventional flexible air hose 32 to the right hand end of the central valve group, generally designated as 33. This group consists of a shutoff valve 34 of conventional design, which may be manually operated by the diver; a check valve 35 shown in cross section; a second check valve 36 also shown in cross section; a second shutoff valve 41; and a mouthpiece 37. Although a mouthpiece alone is shown in these diagrams, it is to be understood that the invention specifically includes the use of a face mask, as an equivalent, or a combined mouthpiece and face mask, or any equivalent of these for introducing air into the divers' lungs. 38 is a snorkle for breathing at the surface and 39 is a screw-type valve cap for the snorkle, of well known design. 40 is a check valve in the snorkle allowing air to be drawn into it but preventing air from moving in the opposite direction. 42 is a flexible air hose of the same type as 32. Both of these air hoses, 32 and 42, connect to the gill respirator air conduits, as shown. 43 is an adjustable air exit valve, the construction of which is shown in detail in FIG. 11. The purpose of this valve is to allow air to escape from the breathing circuit out into the surrounding water whenever the air pressure in the air breathing circuit becomes enough greater than the pressure of the surrounding water to compress the adjustable spring in this valve and unseat the valve diaphragm. The spring is made adjustable so that the amount of pressure obtainable in the air breathing circuit above that of the outside water pressure (at which point the valve will open) is an adjustable factor.

Figure 11:
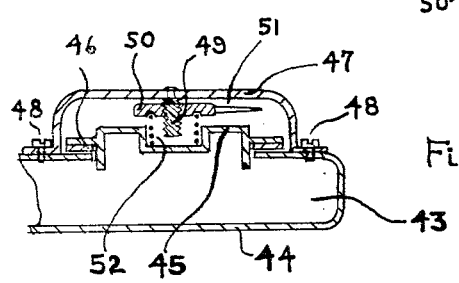
FIGURE 11 shows a cross sectional view of the adjustable air exit valve of FIGURE 10, taken along the line C—C.

In FIG. 11, 44 designates the body portion of the valve. 45 is the valve diaphragm which normally holds this valve closed. 46 is a gasket of rubber or other appropriate material, cemented to the under side of the flange 45 as shown. 47 is a bridge member made of appropriate metal secured to the body of the valve 44 by attachment screws 48, 48, across the top of the valve as shown in FIGS. 10 and 11. At the center of this bridge member 47, a threaded stud 49 is riveted. The threads of this stud carry the threaded adjustment knob 50 which includes a pointer 51. The underside of the adjustment knob 50 is grooved to receive the upper end of coil spring 52. The lower end of spring 52 is contained within the cup portion of the valve diaphragm 45, as shown. It is intended that quite a light spring will be used as the spring 52 and that when the adjustment knob is set for least pressure, the resultant spring pressure bearing upon the diaphragm 45 will be only a very small fraction of an ounce. Adjustment of the knob clockwise in FIG. 10 will increase the spring pressure on the valve diaphragm and it will then require a greater pressure difference between the air inside the breathing circuit and the water outside to unseat the valve diaphragm 45 and allow air to escape.

This valve has two principal purposes. One of them is in connection with charging the system with air at the surface, as will be described later. The second purpose of the valve 43 becomes important in the forms of the invention shown in FIG. 12 and FIG. 14. In these systems, it is intended that at certain times and for certain purposes compressed air will be introduced into the breathing circuit from the auxiliary tanks shown. This might result in a considerably higher pressure of air being in the breathing circuit than is present in the outside water, particularly when a diver is returning toward the surface and the pressure of the outside water is rapidly diminishing. It is an important safety factor that automatic valve means be included in the equipment to release the excess air even if a diver should forget to balance these forces manually. It is not only important in protecting the permeable membranes of the equipment, it is also extremely important that the air in the diver's lungs has its pressure reduced at the same rate as the pressure of the water outside. If not, and if he should arrive at the surface with a considerable pressure of air in his lungs, and then should breathe air at atmospheric pressure, the delicate tissues of the lungs may burst causing the condition known by the medical term of "embolism," and this condition is quite capable of killing the diver. The automatic exit valve 43, therefore, is an important safety feature of the invention. 53 is a handle attached to the air exit valve diaphragm 45 and may be used to lift the diaphragm manually to permit the escape of air.

The operation of the equipment shown in FIG. 10, is as follows. Assuming that the diver is wearing the equipment and is in the water at the surface, submerged except for his head and shoulders, he will first unscrew the snorkle valve cap 39 and breathe in the ordinary manner. Each inhalation will suck air in thru the cap 39, down thru the snorkle tube 38, thru the check valve 40, thru the mouthpiece 37, and into his lungs. In order to charge the gill respirator unit with air he will turn off the shutoff valve 34. Continued breathing on the part of the diver will result in each exhaled breath passing thru check valve 36, thru shutoff valve 41 which is open, up thru air hose 42, down thru the left side of the gill respirator unit 31, across toward the right side of the stack of gill respirator elements, up thru the right side of the gill respirator 31, and down thru the air hose 32. Because shutoff valve 34 is closed, the exhaled air in the breather circuit is not free to circulate and will build up pressure with each exhalation until the air pressure unseats the air exit valve 43. The diver will know when he has reached this condition because he will see and hear the air escaping and bubbling. This is notice to him that the operation of charging the equipment with air has been completed. Then the diver, while holding his breath, will close the snorkle valve cap 39 and open the shutoff valve 34. Thereafter, he will continue breathing in the normal manner and is ready to submerge. The check valves 35 and 36 will cause each exhaled breath to pass upward thru air hose 42 and each inhaled breath to pass downward thru air hose 32, and thru the air breathing circuit already described. The exhaled air, as it passes thru the gill respirator elements, will extract oxygen from the surrounding water and at the same time will dispose of the excess $CO_2$ in the exhaled breath by passing this outward and dissolving it in the surrounding water.

As previously pointed out, the flexibility of the permeable membranes and the type of structure provided in this design will enable the volumetric capacity of the air passages to be reduced as the pressure of the surrounding water increases as the diver submerges to increasing depths in the water. Because this factor is provided for in this design the air pressure in the breathing circuit will always adjust itself to the same pressure as the surrounding water.

The system shown in FIG. 12 is the same as that shown in FIG. 10 with the exception that a small compressed air tank 54 has been added along with an air pump 55, and their associated valves. The tank 54 has a hand operated valve 56 controlling the air flowing out of the tank and into the flexible hose 57 and thru the three way shutoff valve 58.

Figure 13:
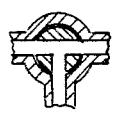
FIGURE 13 is a detailed view showing part of the construction of the three way valve in FIGURE 12 which connects the compressed air supply with the rest of the system.

FIGURE 13 shows a cross section of such a three way valve. The inner section may be rotated to control the flow of air between the three parts in a manner well known to the art.

In FIG. 12, the hand pump 55 is connected internally thru a conventional check valve at its output side to the compressed air tank 54. The hand pump takes in air thru the hand operated valve 59, thru the flexible connecting air line 60 and thru the three way shutoff valve 61. The compressed air tank 54 is also equipped with a pressure gauge 62 showing the pressure of the compressed air within the tank. Compressed air tank 54 and hand pump 55 are equipped with lugs 63, 63, 63, 63, for attaching a harness to be worn by the diver.

The operation is as follows. While charging the equipment with air at the surface, as previously described in connection with the operation of the system shown in FIG. 10, the pump valve 59 may be opened and the hand pump 55 may be operated to take air from the breathing circuit and compress it in the small compressed air tank 54. When the gill respirator unit and the breathing circuit has been fully charged with air at the surface, as previously described, and when the diver closes the snorkle valve 59 and submerges, if he goes down to an appreciable depth the air in the breathing circuit will become more compressed as the pressure of the water into which the diver descends increases. For example, if the diver descends to 33 ft. of depth, the pressure of the water doubles and the air in the breathing circuit also has its pressure doubled and, therefore, will have only half its former volume. This will reduce the buoyancy of the diver and his apparatus. It is usual practice today for divers to wear weight belts and to carry a number of weights on the belt in accordance with personal choice as to the buoyancy desired. If a diver using this equipment had chosen to wear enough weights on his weight belt to have neutral buoyancy at the surface, then as he descended and the additional water pressure compressed the air in the breathing circuit, he would have considerable negative buoyancy. If he wished to restore his neutral buoyancy with this equipment, he could do so while submerged by opening the hand operated valve 56 and carefully allowing enough compressed air from tank 54 to enter the breathing circuit to expand the gill respirator elements to their former size, thereby displacing the same amount of water as when at the surface. If he should allow too much compressed air into the breathing circuit for neutral buoyancy, so that his buoyancy became positive, he could correct this by opening the pump valve 59 and operating the hand pump 55 while under water, thereby pumping some of the air in the breathing circuit back into the compressed air tank 54. Similarly, as he might choose to swim at various depths during his under water swimming, he can repeatedly obtain his desired buoyancy for the varying pressure conditions by opening valve 56 to increase buoyancy or by opening valve 59 and operating hand pump 55 to decrease buoyancy. An additional use for this system is in a situation where a diver may wish to carry a heavy object to the surface. In this case, while he may take hold of the object at the bottom when his buoyancy is neutral, he may wish to increase his buoyancy as an aid in carrying it to the surface and thereby reduce the effort of swimming up. Similarly, a diver may wish to operate at negative buoyancy at the surface as a means of getting to the bottom rapidly.

The compressed air in the tank 54 can also be used as an auxiliary air supply without affecting buoyancy by opening valve 56 to pass new air into the breathing circuit and then by manually operating the air exit valve diaphragm handle 53 to allow a corresponding amount of the old air to escape into the water, or by pumping an equivalent amount of old air from the breathing circuit back into the compressed air tank 54.

Pump 55 can also be employed as a drainage pump for pumping out water which may have leaked into the breathing system. Such leaked water will first accumulate in the valve housing 43, because this is made the low point in the breathing circuit. A manually operated valve (well known to the art—not shown) may be connected to the bottom of the housing 43. This valve, in turn, may be connected by a flexible hose to valve 59. Also, a manually operated petcock and a check valve (both also well known—not shown) may be attached to the lowest point of the tank 54. Then if leaked water accumulates in housing 43, the valve there may be opened and also valve 59, and the manual pump 55 may be operated, which will pump the leaked water from housing 43 into tank 54. Then the manually operated drainage petcock in tank 54 may be opened, and the air pressure in tank 54 will blow the water out. The check valve will keep any water from coming in under any circumstances—a safety precaution.

The system shown in FIG. 14 is identical with that shown in FIG. 10 except that the shutoff valves 34 and 41 of FIG. 10 are replaced by proportioning valves 65 and 64 in FIG. 14.

FIG. 15 shows such a proportioning valve in cross section. It will be seen that the rotatable central part can be rotated clockwise or counterclockwise to completely close either branch of the valve or can be positioned to vary the proportioning of the air flowing in the two left branches of the valve, or can be rotated to shut off the flow of air altogether. The valves 64 and 65 are identical in operation. The air hoses 66 and 67 connect the proportioning valves 64 and 65 with a demand regulator 68 which is of well known type widely used in self contained under water breathing apparatus. This regulator 68 also has a central push button, also well known in the art, for manually depressing the diaphragm of the demand regulator in order to pass air from the compressed air supply into the breathing circuit. 70 is a conventional tank of compressed air and is equipped with the lugs 71 which are provided for attaching a harness to be worn by the diver.

The primary purpose of the system shown in FIG. 14 is to provide the gill respirator unit for breathing under water most of the time, but to also provide an auxiliary compressed air supply which the diver may use if he gets into polluted water. Fish very frequently die when they enter polluted water because the toxic gases in such water go thru the gill membranes and enter the blood stream of the fish and there is no way the fish can prevent it. In contrast, in this system, we supply an improvement over anything the fish can make use of. The diver, as soon as he smells the toxic gases of polluted water, can turn the handle of the proportioning valve 64 clockwise so that his breathing circuit is connected only with the air hose 66 and can also turn the control handle of proportioning valve 65 counter clockwise so that his beathing system is connected only with hose 67. Under these circumstances, the gill respirator unit breathing circuit is completely shut off from the diver and will remain inoperative. The diver will continue to breathe in a normal manner and will obtain his air exclusively from the compressed air tank 70 in the well known manner characteristic of self contained under water breathing apparatus.

If the diver, instead of entering polluted water, should find himself in water which has less than the normal amount of dissolved oxygen in it, he may adjust the equipment to breathe a mixture of air, reoxygenated by the gill respirator unit and new air obtained from the auxiliary compressed air supply in tank 70. For example, if he should like to have a mixture which is approximately half and half, he would set the control handles of valves 64 and 65 as shown in FIGS. 14 and 15. Small changes of the positions of these control handles would vary the proportion accordingly.

Another use for the equipment is to pass air from tank 70 into the breathing circuit of the gill respirator unit, which can be done by turning valve 65 so that it connects only with the air hose 42. If it is desired to increase the buoyancy of the equipment with the valve setting just described, the manual button 69 may also be operated which will release additional air into the total breathing circuit and will expand the gill respirator elements, thereby increasing the buoyancy of the equipment.

At any time after the diver has left either polluted water or water having less than normal oxygen content, he can reset the valves 64 and 65 so that he is breathing thru the gill respirator unit only.

While the systems discussed have talked in terms of use of air and comrpessed air, it is to be specifically understood that the scope of this invention includes also the use of oxygen and compressed oxygen or any other breathable gas or gas mixture. For most purposes, compressed oxygen is considered less useful because of the danger of oxygen poisoning at depths greater than 25 feet, unless used by persons well aware of the danger and extremely skilled in the use of oxygen under such conditions. In contrast, the compressed air equipment is regularly used at depths of 100, 200, and even 300 feet.

In connection with leaked water, in all three systems as shown in FIGS. 10, 12, and 14, the air exit valve 43 is purposely located directly below the air passage ways leading to the mouthpiece of face mask, so that leaked water will naturally flow down into the internal space provided by this valve and there will be far less likelihood that an inhaltion will suck water into the diver's lungs. Also, this is the best location for leaked water in connection with expelling it. In the system shown in FIG. 10, the diver may expel leaked water by first inhaling a deep breath, and then turning off valve 41, and then expelling his breath sharply. The exhaled breath can only escape by unseating the diaphragm of air exit valve 43 and the air flowing out will carry the leaked water with it. The process may be repeated if necessary to expel all the leaked water.

In the system shown in FIG. 12, the same thing can be accomplished by closing valve 58 and exhaling sharply, or leaked water can be blown out by compressed air by opening valve 56 and passing enough air into the breathing circuit so that the pressure provided for by the setting of control knob 50 is exceeded and the valve 43 will open automatically, the air expelled thereby carrying out the leaked water also.

In FIG. 14, leaked water may be blown out by the exhaled breath of the diver by closing valve 65 and exhaling sharply, or by also turning valve 64 so that it connects only with hose 66, and then operating button 69 which will release compressed air from tank 70 and blow out the leaked water.

FIG. 16 is a fragmentary enlarged cross sectional view, comparable to FIG. 4, but shows an alternative form of construction for a gill element. In this design, a central core member 73, having a multiplicity of channels 74—74 formed in its opposite faces supports the permeable or porous membrane material 75—75. Optional stiffener and spacing members 76—76 may be used, like those shown in FIGS. 9A, 9B, and 9C. Even though the channels 74—74 may be made quite small in size, the fact that they operate in parallel for each gill element, and that the gill elements also operate in parallel, readily suplies ample cross sectional area for easy breathing. This core element 73 extends right up to the elongated washer and spacer subassemblies 5—5 of FIG. 1, air passing freely from one to the other.

FIG. 17 is a process diagram showing the principles of this invention applied to rehabilitating the exhaled breath of one or more persons in under water vessels, other under water housings, work spaces, living spaces, etc. For example, successful experiments have recently been made with an under water "house" containing beds, cooking facilities, electric lights, and even television, where two men lived for a week 33 feet below the surface of the sea. This undoubtedly will be a growing field of development, for one reason because it eliminates a great deal of decompression time now required where extended under water work needs to be done. Instead of taking air down in tanks or piping it down, it would be very advantageous to use my invention of extracting dissolved oxygen from the unlimited sea water and disposing of $CO_2$, or to use this as an alternative system—safety being much enhanced by having two kinds of systems for protection of the lives of the persons there.

In FIG. 17, 76 represents the surrounding body of water, a portion of which is pumped in thru the hull of an under water vessel or wall of a housing 77 by the pump 78 thru the conduit 79 and valve 80; into the gas exchange unit 81 and out by pump 82, thru conduit 83, thru valve 84 and back to the surrounding body of water 76. This completes the water circuit.

The exhaled breath of the person or persons submerged is pumped by pump 85 thru the conduit 86 into the gas exchange unit 81 and then out thru conduit 87 back to be rebreathed. The gas exchange unit 81 can consist of any of the previously discussed gas permeable or porous sheet materials used to form passage ways thru which the exhaled air is pumped, such units being bathed by the flowing water 76 whereby dissolved oxygen is extracted from the water and carbon dioxide is extracted from the exhaled breath, such extracted oxygen being added to the exhaled breath and carbon dioxide being passed off into the water, and the rehabilitated air being returned to the person or persons for rebreathing.

FIG. 18 shows an alternative form of gas exchange unit where the transference of carbon dioxide from air to water and of oxygen from the water to the air takes place directly across the air-to-water interfaces without any barrier material being used. The wall 88 of the gas exchange unit 81 is partially filled with the water 76. Pipes or other gas conducting means 89 with spaced apertures cause the exhaled air to bubble up thru the water. These bubbles would preferably be very small and in enormous numbers so that the air is provided with a very large surface area (relative to its volume) in direct contact with the water for enhancing the gas exchange. FIG. 18 is not necessarily to scale, and its vertical height may be increased as much as desired to provide full gas exchange of the bubbles as they rise vertically thru the water.

There may be considerably greater pressure in the water 76 than in the inside of the vessel or housing 77, with possible danger of flooding if the pumps should fail. As a safety feature, the pumps 78 and 82 and valves 80 and 84 (these valves preferably being of a type which can be actuated either manually or electrically) are interconnected so that at any time that the pumps 78 or 82 fall below their proper speed, or stop, the valves 80 and 84 will automatically close, thus assuring against flooding, and the alarms 90 or 91 will ring. This system will have an independent power supply from that driving the pumps 78 and 82. The units on the pumps sensing their speed can be well known centrifugal governors, but connected to actuate the valves and alarms instead of being connected to control the speed of the pumps.

In the claims, it is to be understood that the term "gas permeable" material, membrane, barrier, element, etc, includes both or either continuous materials, as defined earlier in the specification (like cellophane) or alternatively, porous materials, like microporous plastics, wet strength paper, etc., since either of these classes of materials can be used in this invention, as can also the direct air-to-water interfaces.

It is to be understood that the particular forms of my invention as shown and described here are to be taken as illustrative examples of the same, but that various changes in shape, size, operative elements, combinations, materials, and arrangements of parts may be resorted to without departing from the spirit and scope of this invention.

Having described my invention, I claim:

1. A method of reoxygenating the exhaled breath of a person, wherein a substantially liquid-impervious oxygen-permeable membrane is utilized, comprising the steps of moving the exhaled breath to and in contact with one side of the liquid-impervious oxygen-permeable membrane, disposing the other side of the liquid-impervious oxygen-permeable membrane in contact with water containing dissolved oxygen to extract dissolved oxygen from said water through the membrane, and adding said dissolved oxygen to said exhaled breath while excluding water, and moving said reoxygenated breath to the person for rebreathing.

2. A method of reoxygenating the exhaled breath of a person, wherein a liquid-impervious barrier member including a multiplicity of small holes is utilized, comprising the steps of moving the exhaled breath to and in contact with one side of said barrier member, disposing the other side of the barrier member in contact with water containing dissolved oxygen to extract dissolved oxygen from said water, and adding said dissolved oxygen to said exhaled breath while excluding water, and moving said reoxygenated breath to the person for rebreathing.

3. The method of reoxygenating the exhaled breath of a person, comprising the steps of conducting the exhaled breath to water containing dissolved oxygen, bubbling said exhaled breath through said water whereby dissolved oxygen is extracted from said water and is added to said exhaled breath, and conducting said reoxygenated breath back to the person for rebreathing.

4. The method of reoxygenating the exhaled breath of a person, comprising the steps of moving the exhaled breath to oxygen extraction means in contact with water containing dissolved oxygen, extracting dissolved oxygen from said water through the said extraction means and adding said extracted oxygen to the exhaled breath, and moving the reoxygenated breath back to the person for rebreathing.

5. The method of rehabilitating the exhaled breath of a person, wherein a substantially liquid impervious carbon dioxide-permeable membrane is utilized, comprising the steps of transferring the exhaled breath to and in contact with one side of the liquid-impervious carbon dioxide-permeable membrane, disposing the other side of the liquid-impervious carbon dioxide-permeable membrane in contact with water to extract a substantial portion of carbon dioxide from said exhaled breath and dissolving the extracted carbon dioxide in said water, adding oxygen to said exhaled breath from which a substantial portion of carbon dioxide has been extracted, and transferring the rehabilitated breath back to the person.

6. The method of rehabilitating the exhaled breath of a person, wherein a liquid-impervious barrier member including a multiplicity of small holes is utilized, comprising the steps of transferring the exhaled breath to and in contact with one side of said barrier member, disposing the other side of said barrier member in contact with water to extract a substantial portion of the carbon dioxide from the exhaled breath and dissolving the extracted carbon dioxide in said water, adding oxygen to the exhaled breath from which a substantial portion of carbon dioxide has been extracted, and transferring the rehabilitated breath back to the person.

7. The method of rehabilitating the exhaled breath of a person, comprising the steps of conducting the exhaled breath to water, bubbling said exhaled breath through said water to extract a substantial portion of carbon dioxide from said exhaled breath and dissolving said carbon dioxide in said water, adding oxygen to said exhaled breath from which a substantial portion of carbon dioxide has been extracted, and conducting the rehabilitated breath back to the person.

8. In a process for providing a rebreathable atmosphere, the steps including transferring a person's exhaled breath to means adapted to extract oxygen from water containing dissolved oxygen and to extract carbon dioxide from said exhaled breath and passing it to said water for dissolving therein, extracting dissolved oxygen from said water and mixing the extracted oxygen with the exhaled breath to oxygen-enrich it, extracting carbon dioxide from said exhaled breath to substantially purify it, and transferring the oxygen-enriched and substantially purified breath back to the person for rebreathing.

9. In the use of diving equipment, the method including the steps of transferring a person's exhaled breath in a breathing circuit to water containing dissolved oxygen, automatically expanding and contracting volumetrically a portion of the breathing circuit to equalize the pressure of the exhaled breath in the breathing circuit and the pressure of said water, passing gases from the breathing circuit into a rigid container to reduce displacement and buoyancy of the diving equipment, passing gases from the rigid container into the breathing circuit to increase displacement and buoyancy of the diving equipment, extracting oxygen from said water and mixing the extracted oxygen with the exhaled breath, and transferring the reoxygenated breath back to the person for rebreathing.

10. In a process for providing a rebreathable atmosphere, the steps including transferring a person's exhaled breath to water containing dissolved oxygen, extracting dissolved oxygen from the water and mixing the extracted oxygen with the exhaled breath, obtaining additional oxygen from an auxiliary oxygen supply, and mixing the gas from the auxiliary supply in any desired proportion to the exhaled breath containing oxygen extracted from the water, and transferring the resulting mixed gases to the person for rebreathing.

11. In maintaining a breathable atmosphere in a submarine where the outside water pressure is different from the inside air pressure, the method including the steps of conducting exhaled breath to water containing dissolved oxygen, equalizing the pressures of said water and said exhaled breath, extracting oxygen from said water and mixing the extracted oxygen with the exhaled breath, and conducting the reoxygenated breath back to the personnel of the submarine for rebreathing.

12. In maintaining a breathable atmosphere in a submarine where the outside water pressure is different from the inside air pressure, the method including the steps of conducting exhaled breath to water, equalizing the pressures of said water and said exhaled breath, extracting carbon dioxide from said exhaled breath and dissolving the extracted carbon dioxide in said water, adding oxygen to said exhaled breath, and conducting the mixed gases to the personnel of the submarine for rebreathing.

13. In a process for providing a rebreathable atmosphere, the steps including transferring the exhaled breath of a person to means adapted to extract dissolved oxygen from water, extracting dissolved oxygen from water with said means and mixing the extracted oxygen with the breath to oxygen-enrich it, and transferring said oxygen-enriched breath back to the person for rebreathing.

14. Gill-type respirator equipment for underwater breathing including conduit means adapted to conduct the exhaled breath away from a person's face, a face piece in communication with said conduit means, a gas exchange unit connected to the conduit means and adapted to extract dissolved oxygen from the surrounding water and mix said extracted oxygen with the exhaled breath, and gas return means connected to said gas exchange unit and adapted to conduct the reoxygenated breath back to the person's face for rebreathing.

15. Gill-type respirator equipment for underwater use including conducting means adapted to convey the exhaled breath of a person away from the person, a gas exchange unit connected to said conducting means, said gas exchange unit adapted to extract dissolved oxygen from the water and to mix the extracted oxygen with the exhaled breath, an auxiliary supply of oxygen, proportioning means connecting said auxiliary supply of oxygen with the mixture of exhaled breath and extracted oxygen whereby the oxygen from said auxiliary supply may be added in any desired proportion, and gas return means adapted to convey the resulting mixed gases back to the person for rebreathing.

16. Gill-type respirator equipment for underwater use including conduit means adapted to conduct the exhaled breath away from a person's face, a face piece in communication with said conduit means, a gas exchange unit connected to the conduit means and adapted to extract dissolved oxygen from the surrounding water and mix said extracted oxygen with the exhaled breath, variable volumetric means connected to the conduit means and adapted to be expanded to provide increased buoyancy for the equipment and adapted to be compressed to provide decreased buoyancy for the equipment, and gas return means connected to said gas exchange unit and adapted to conduct the reoxygenated breath back to the person's face for rebreathing.

17. In equipment for rehabilitating exhaled breath, the combination including a housing adapted to exclude water and provide a space for confining a person's exhaled breath, and means adapted to extract dissolved oxygen from water, said extracting means coacting with said exhaled breath and said water containing dissolved oxygen whereby dissolved oxygen is extracted from said water and is mixed with said exhaled breath to oxygen-enrich it for rebreathing.

18. In equipment in accordance with claim 17, wherein said means comprises a membrane formed of silicone rubber.

References Cited by the Examiner

UNITED STATES PATENTS

| | | | |
|---|---|---|---|
| 908,690 | 1/1909 | Neubert | 128—145 |
| 1,946,126 | 2/1934 | Black | 128—145 |
| 2,232,901 | 2/1941 | Brisbaue | 103—40 |
| 2,388,674 | 11/1945 | Browne | 128—144 X |
| 2,483,116 | 9/1949 | Yarbrough | 128—142 |
| 2,488,261 | 11/1949 | Bedini | 128—142 |
| 2,686,154 | 8/1954 | MacNeill | 210—321 |
| 2,782,429 | 2/1957 | Hennebutte | 9—319 |
| 2,864,101 | 12/1958 | Kissenberger | 9—319 |
| 3,025,207 | 3/1962 | Chetakian | 156—246 |
| 3,039,393 | 6/1962 | Yaindl | 103—40 |
| 3,046,180 | 7/1962 | Diehl | 156—246 |

RICHARD A. GAUDET, *Primary Examiner.*